July 8, 1958 J. S. LUGT 2,842,618

SIMULTANEOUS VIEWING AND COMMUNICATION SYSTEM

Filed June 7, 1957

INVENTOR.
JOHN S. LUGT
BY
D. Gordon Angus
ATTORNEY 2,842,618
Patented July 8, 1958

2,842,618

SIMULTANEOUS VIEWING AND COMMUNICATION SYSTEM

John S. Lugt, South Pasadena, Calif., assignor to John S. Lugt Corporation, Los Angeles, Calif., a corporation of California Application June 7, 1957, Serial No. 664,307

8 Claims. (Cl. 179—1)

This invention relates to a simultaneous viewing and communication system.

An object of this invention is to provide structure and a system whereby a person located at a subject station can be viewed in reduced size by a number of observers, and whereby the subject can communicate individually with various selected ones of the observers.

A related object is to provide means for signaling the particular observer to whom the subject wishes to speak, while signaling the other observers that the subject does not wish to speak with them at that time.

It frequently happens that when celebrities and the like are to be interviewed in person, the crowds are such that it is not practicable for the celebrity to meet each person individually, person-to-person. This is particularly true during holiday periods, such as where persons impersonating Santa Claus are on hand to greet children. There is often a long delay while one child is led away and another one is brought up to see the person impersonating Santa Claus. In addition, considerable time is consumed in getting each child calmed down for the interview when he is talking directly to the impersonator. For these reasons, it has been necessary for young children to stand in line for long periods of time waiting to see Santa Claus which creates a distracting hubbub. This in turn requires the hiring of extra help to keep the line moving. It also frays the temper of the person impersonating Santa Claus, thereby making his task more difficult, because he is under the obligation not only to speak kindly to each child, but also keep the line moving as rapidly as possible.

A feature of this invention resides in an enclosure for the subject to be viewed and talked with, wherein such enclosure may, if desired, be made up as a stage set with a false front wall. The set may be appropriately decorated. The subject is positioned at a subject station at which there is a telephone and a switch. This switch is intended to connect the telephone at the subject station with an individual one of the telephones at the various observer stations, and also to actuate signals at the various observer stations that indicate which observer stations are or are not in communication with the subject station.

A related feature of this invention resides in the provision in the aforesaid front wall between the observer stations and the subject station, of a reducing lens which is preferably, but not necessarily given the general outline of a television cathode-ray tube. By this means the illusion is given that the subject fits within the screen, and the observer has a familiar illusion which is calming, as opposed to the unfamiliar personal contact with a subject such as Santa Claus. The subject and his entire surroundings are easily apparent to the observer, thereby giving a certain illusion of distance. The simultaneous viewing of the subject through this reducing lens and the selective communication with said subject provides an effective illusion of direct television communication between the observer and the subject.

One of the preferred features of this invention resides in providing a plurality of observers stations, each of said stations having the aforesaid telephone, signal, and reducing lens systems, whereby a plurality of lines of prospective observers can be formed, and the subject can talk with an observer in one of the lines, while the observer who has just finished talking to him from another observer station is replaced with a new one. In this manner, there is little or no delay between each observer and the subject is insulated from irksome personal contact with the various observers.

The above and other features of this invention will be fully understood from the following detailed description and the accompanying drawings, of which:

Figures 1, 3:
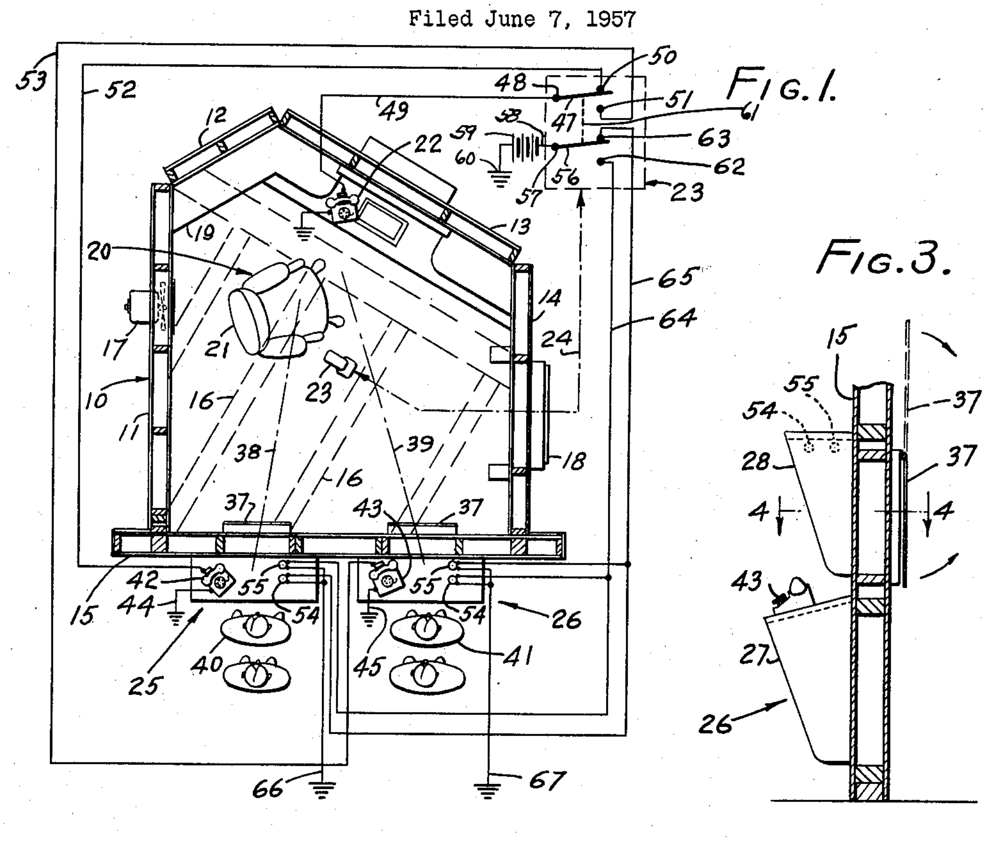
Fig. 1 is a plan view, partly in cross section and partly in schematic notation, showing the simultaneous viewing and communication system according to this invention.
Fig. 3 is a cross section taken at line 3—3 of Fig. 2.

As shown in Fig. 1, an effective means for carrying out this invention is provided in combination with an enclosure 10 having side walls 11, 12, 13 and 14. These walls have the usual studs, cross-pieces, and panellings, and may conveniently be constructed in the form common to stage settings. In addition, there is a false front wall 15 which will be described in further detail below. A ceiling (not shown) is supported by beams 16 which are shown in phantom line in Fig. 1, the section of the enclosure being taken just below the beams.

A ventilating fan 17 is placed in side wall 11, and an air outlet 18 is placed in wall 14. For decorative purposes, shelves 19 may be placed along the side walls, and they may conveniently be provided with exhibits appropriate with the subject being observed. A subject station 20 is centered at a chair 21 in which the subject (not shown) is seated when this system is in operation. A subject telephone 22 is placed on shelf 19, and a foot switch 23 is placed on the floor adjacent to the chair 21. For convenience in illustration, the switch is shown in its electrical detail outside the enclosure as is indicated by the dashed line 24. The switch connections will be further described below. This switch may, if desired, be placed on the telephone, or at any other desired place, instead of at the foot of the subject.

With further respect to the front wall 15, there are provided a plurality of observer stations 25, 26, the structure of details of these observer stations being best shown in Fig. 3 wherein there is a desk 27 and a hood 28. Each hood forms a shroud for the top and two sides of one of the reducing lens systems 29, 30. One of the desks is also provided for each observer station. It will be understood that, while two observer stations are shown in the illustration, more than two of them may be provided, still obtaining the advantages of this invention.

Figure 4:
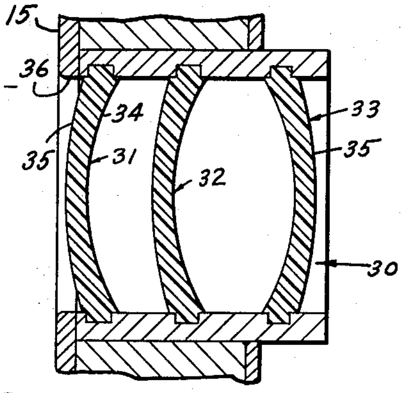
Fig. 4 is a cross section taken at line 4—4 of Fig. 3.

The reducing lens system is shown in greater detail in Fig. 4, and comprises three negative lenses 31, 32, 33. Each of these lenses has a concave side 34 and a convex side 35. As shown in Fig. 4, lenses 31 and 32, which are the closest of these negative lenses to the observers station, have their convex side facing toward said observer station, while lens 33 which is the closest to the subject station has its convex side facing toward the subject station. This positioning of lenses gives a large undistorted field. These lenses may be of any desired power, the well known plastic lenses being especially suited for this purpose.

Figure 2:
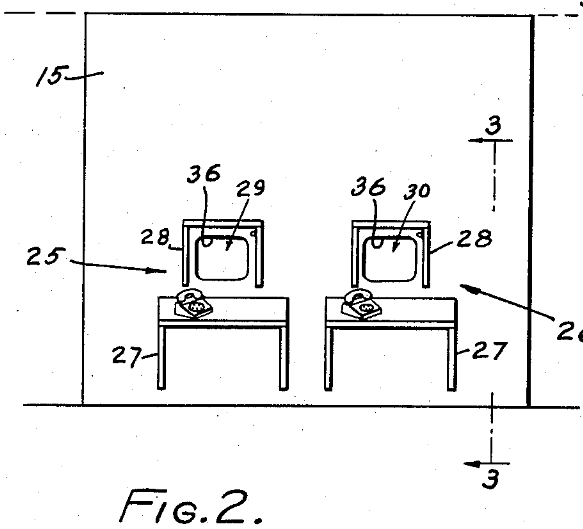
Fig. 2 is a front elevation of the structure of Fig. 1.

As can best be seen from Fig. 2, the opening 36 in the front wall 15 is cut so that the exposed area of the negative lens 31 has the contour of a conventional home television cathode ray tube. Particularly for children, this gives the illusion of a situation with which they are familiar, and minimizes delays which result from having to accustom a child to a novel situation. As best shown in Fig. 3, a cover 37 is hinged to the back side of the wall 15, and the cover can be dropped to protect the rear of the lens, and also to conceal the inside of the enclosure from view by observers whenever desired.

It will be observed that the observer stations 25 and 26 have optical axis 38, 39, respectively, which intersect the subject station. This is not to say that the lenses need be exactly aligned with said suject station, but only that the said subject station is within the field of the lens system. Then observers 40 and 41 at observer stations 25 and 26, respectively, can see the subject at the subject station.

Observer stations 25 and 26 are provided with observer telephones 42, 43, respectively. Each of these telephones is individually grounded by grounds 44, 45, respectively. Subject telephone 22 is grounded at 46. Switch 23 includes a pivotable contactor 47 with a terminal 48 connected by a lead 49 to the subject telephone 22. This pivotable contactor is adapted to be moved into contact with one or the other of contacts 50 and 51.

Leads 52 and 53 are connected to observer telephones 42 and 43 and to contacts 50 and 51, respectively. It will thus be seen that by pushing the switch 23 to one position of the other, either telephone 42 or telephone 43 is placed in communication with the subject telephone.

Each of the observer stations has a pair of illuminable lamps for signals. A lamp 54 of a first color, which may be green, for example, is placed within the hood of each observer station, while a second lamp 55 of a second color, such as red, is also placed within said hood.

Switch 23 includes a second pivotable contactor 56 having a terminal 57 connected by a lead 58 to a battery 59 or some other source of electricity. The battery or other source is grounded at 60. The pivotable contactors 47 and 56 are ganged as shown by line 61 so that they move simultaneously when the foot switch 23 is moved.

The second pivotable contactor is adapted to make selective contact with contacts 62 and 63. In turn, leads 64, 65 are connected to contacts 62 and 63 respectively. Lead 64 branches to connect to one terminal of the lamp 54 of first color (green) at observer station 26, and also to connect to one terminal lamp 55 at observer station 25 of the other color (red). Had there been provided additional observer stations, then lead 64 would have branched to connect with the lamp 55 of second color (red) at each of the other observer stations as well. It will thereby be seen that when the pivotable contactor 56 touches contact 62 then a green light 54 will be illumined at observer station 26, and a red light 55 will be illumined at all other observer stations.

Lead 65 branches to make contact with one terminal of a lamp 54 of first color (green) at observer station 25, and with the lamp 55 of second color (red) at observer station 26. It will therefore be seen that when the pivotable contactor 56 touches contact 63, a green light will be illumined at observer station 25 and a red light will be illumined at all other observer stations. Had more than two observer stations been provided, then lead 65 would have been connected to the lamp of second color at each of the other observer stations, so that at the switch setting described, a red light would have been illuminated at all observer stations except station 25.

In accordance with the circuitry described, one and only one of the observer stations will have its lamp of first color (green) illuminated at any given time, and at the same time the lamp of second color (red) will be illumined at the remaining observer stations. If the first color is green and the second color is red, the green light will indicate the station to which the subject wishes to talk and the red light will indicate the stations to which the subject does not desire to talk. Grounds 66, 67 at observer stations 25 and 26, respectively, are common to all of the lamps in each circuit for completion of the lamp circuits.

The gang system of switch 23 switches the subject telephone into communication with the observer telephone where the lamp of first color is illuminated. For example, in the connection as shown in Fig. 1, the pivotable contactors 47 and 56 are in their uppermost position, so that contactor 47 connects the subject telephone 22 through leads 49 and 52 to observer telephone 42 at observer station 25. At the same time the contactor 56 touches contact 63 and thereby establishes a circuit through lead 65 to the red lamp 55 at observer station 26, and to the green light at observer station 25. The observer at station 25 is therefore informed that he can communicate directly with the subject, and the telephone circuit is completed for that purpose. Reversal of the switch so that the contactors 47 and 56 touch contacts 51 and 62 respectively, switches the subject telephone 22 into communication with observer telephone 43, illuminates green lamp 54 at station 26 and red lamp 55 at observer station 25.

If more than two observer stations are provided, it is only necessary to provide more contacts on the switch 23 and to make the circuit adaptation as described above.

The system described above has proved to be very effective, particularly with small children who are viewing a person impersonating Santa Claus. It has been observed that the children are convinced that they are in direct television communication with Santa Claus, and indeed the shape of the opening 35 and the reduction of Santa Claus to a size in proportion to usual television scenes leads one so to believe. Also, because Santa Claus can look directly at the selected observer station through the appropriate reducing lens, the illusion of direct television contact with Santa Claus is greatly heightened. In addition, the observers waiting at the station not at the moment in communication with the subject, get an increased sense of anticipation by watching the subject while he speaks to another observer.

This invention permits more than one line of observers to be formed, so that there need be no delay between observers for moving one away from the subject, and moving the next one up to him. In actual practice this system has more than doubled the rate of children passing by and talking to Santa Claus. It is equally applicable to celebrities of various categories, and has the considerable advantage of insulating the subject from the observers. This insulation has been shown to result in better temper for the subject, inasmuch as he is not in touch with each individual observer, nor need he come in direct contact with their individual manners and mannerisms.

This invention is not to be limited by the embodiment shown in the drawings and described in the description, which is given by way of example and not of limitation, but only in accordance with the scope of the appended claims.

I claim:

1. A simultaneous viewing and communication system comprising: a substantially enclosed room having a wall; a subject station in said room; at least two ports in said wall; a reducing lens in each port; an observer station at each port, said subject station being visible from all of said observer stations through the respective reducing lenses in said ports; a telephone at said subject station; a telephone at each of said observer stations; selector means for selectively connecting said telephone at the subject station to any one of the telephones at the observer stations; a pair of visible means at each of said observer stations, each pair of means comprising two members, each member bearing different indicia means; selector means for indicating a selected one of said members at each of said observer stations concurrently, only one of said visible means which is indicated at a given time being different from the indicated visible means at the other observer stations; and ganging means for simultaneously actuating both of said selector means, said ganging means being so connected to said selector means that when the telephone at the subject station is connected to the telephone at a selected one of said observer stations, then the member of the visible means indicated at that selected observer station is the one which is different from the others, as aforesaid, whereby an observer at the selected observer station can communicate via his telephone to a subject at the subject station, and the visible means at his station instructs him to do so, while observers at the other observer stations cannot communicate via their respective telephones to the subject, and the member of the visible means indicated at their respective observer stations instructs them of that fact.

2. Apparatus according to claim 1 in which the visible means at each observer station comprises a pair of illuminable lamps, one lamp being disposed in a separate electricity circuit, and in which the selector means for indicating a selected one of said members comprises a switch.

3. Apparatus according to claim 2 in which the said lamps at each station are of two different colors, a lamp of a first color at one observer being connected in each circuit, and a lamp of a second color at very remaining observer station being connected in the same circuit, there being as many circuits as there are observer stations, whereby any given switch setting one lamp of said first color is illuminated at a selected one of said observer stations, and a lamp of said second color is illuminated at all remaining observer stations.

4. Apparatus according to claim 3 in which said switch simultaneously connects the telephone at the subject station to the telephone at said observer station where the lamp of said first color is illuminated, and leaves disconnected all other observer station telephones.

5. Apparatus according to claim 4 in which said switch is foot-actuated.

6. Apparatus according to claim 4 in which said switch is hand-actuated.

7. Apparatus according to claim 5 in which each reducing lens comprises three individual negative lenses, each having one concave and one convex side, and all having a common optical axis extending between said observer station and said subject station the two negative lenses closest to the observer station having their convex sides facing said observer station, and the lens closest to the subject station having its convex side facing said subject station.

8. Apparatus according to claim 7 in which the reducing lens as seen by the observer has the general shape of an oblong television tube, and in which a hood extends over and at the side of said reducing lens, projecting from said wall toward an observer.

No references cited.